J. B. ENTZ.
SELF PROPELLED VEHICLE.
APPLICATION FILED FEB. 24, 1908.

1,164,588.

Patented Dec. 14, 1915.
6 SHEETS—SHEET 3.

WITNESSES.
F. F. Chudoba.
M. J. Noonan.

INVENTOR.
Justus B. Entz.
by Hermann Hurtz
his Attorney.

J. B. ENTZ.
SELF PROPELLED VEHICLE.
APPLICATION FILED FEB. 24, 1908.

1,164,588.

Patented Dec. 14, 1915.
6 SHEETS—SHEET 4.

WITNESSES
F. F. Chudoba.
M. J. Noonan

INVENTOR
Justus B. Entz.
by Hermann Entz
his Attorney

J. B. ENTZ.
SELF PROPELLED VEHICLE.
APPLICATION FILED FEB. 24, 1908.

1,164,588.

Patented Dec. 14, 1915.
6 SHEETS—SHEET 5.

Fig. 7.

WITNESSES.
F. F. Chudoba
M. J. Norcan

INVENTOR.
Justus B. Entz.
by Hermann F. Cuntz
his Attorney.

Fig. 8.

UNITED STATES PATENT OFFICE.

JUSTUS B. ENTZ, OF HARTFORD, CONNECTICUT.

SELF-PROPELLED VEHICLE.

1,164,588.

Specification of Letters Patent.   Patented Dec. 14, 1915.

Application filed February 24, 1908.   Serial No. 417,309.

*To all whom it may concern:*

Be it known that I, JUSTUS B. ENTZ, a citizen of the United States, residing at the city of Hartford, in the county of Hartford and State of Connecticut, have invented certain new and useful Improvements in Self-Propelled Vehicles, of which the following is a specification, due reference being had to the drawings hereto annexed, forming a part hereof.

This invention relates to self-propelled vehicles including power transmission and control therefor, as well as other features, construction and arrangement of parts, which may be used in connection therewith.

Among the objects of the invention are the production of a more effective means of transmitting power from the original source on the vehicle to the driving wheels; a simpler and a more suitable means for transmitting such power to meet the requirements, as more particularly required in vehicles now known as automobiles; a more simple means of control of the power; means for effectively controlling a plurality of speeds in one direction, and in the opposite direction, more simply, compart and efficient; means for automatically retarding or effecting a braking action; means of construction and support of transmission elements or other parts required to effect the objects of my invention.

In a preferred form of my invention, some of my particular purposes are to construct, arrange or interconnect a plurality of electrical units and a source of power to most efficiently, effectively and simply enable me to secure all desired speeds, both positive and negative in an automobile and to control power transmission by minimum of controlling members and to insure certainty of control, to be proof against false operation, and to effect in many advantageous ways the control of movement of an automobile in any desired manner.

To more fully set forth my invention I hereinafter will describe and show in detail one embodiment of my invention.

It will be understood that my invention may be variously embodied or constructed and as to details and parts may vary without departing from the spirit of my invention.

The particular embodiment, which I now describe has reference to the accompanying drawings forming a part hereof, in which—

In the particular embodiment of my invention as shown in the drawings, A is an engine, which in my preferred form is an internal combustion engine, a four cylinder crank case engine being shown, B is a motor generator, C is a motor, the second electrical unit, which I will call the motor as it usually operates as such; D is a clutch, E is a controller.

The principal parts of the vehicle include the main frame $A^1$. An ordinary body including dash and engine covering $A^2$, front springs $A^3$, front axle with steering wheels $A^4$, and steering connections operated by the pillar and steering wheel $A^5$; while the rear springs $A^6$ support the rear wheels and axle parts $A^7$, such axle parts being contained in a casing $A^8$ with brake drums $A^9$ on the driving wheels, while in the middle of the rear axle casing $A^8$, there is contained gearing driven through a flexible joint by the shaft F.

The motor generator B includes the fields $B'$ and the armature $B^2$ with its commutator $b$, which is engaged by brushes $b'$ supported in a frame $b^2$ and engaged by a lever $b^4$, which is supported on a member of the frame $b^2$, so that $b^4$ being with the brush holders $b^2$ rotate with the field. Springs $b^5$ operate to force the brush against the commutator; $b^3$ is an enlargement on or a weight at the end of arm $b^4$ on the opposite side of the pivot for the brush pressing end.

$b^6$ are four collector rings, two of which are electrically connected with the brushes $b'$, while two are electrically connected with the coils of field $B'$.

The second unit C has a field $C'$ and two armature windings $C^2$ $C^2$ and two commutators, one of which is shown, and has at the end of its shaft the clutch $c$ opposed to one clutch face of the main clutch B.

Figure 3:
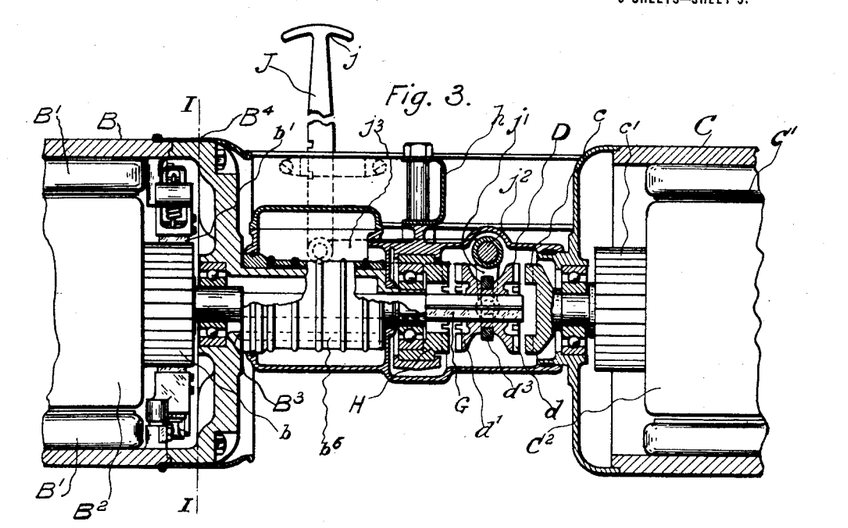
Fig. 3 is a longitudinal vertical section, in part, showing the mounting of fields and armatures, commutators, collector rings and interconnections between the electrical units.

From the engine A, a shaft $a$ projects rearwardly and is attached to the field frame supporting the fields $B'$ of the motor generator B; the forward end of the shaft of the armature $B^2$ has a bearing in the forward end of the field frame $B'$, while the opposite end of the field frame $B'$ extends inwardly, forming a bearing end $B^3$, and has a protecting casing $B^4$ surrounding it. The field frame $B'$ has also an extension which projects rearwardly from the end $B^3$, and on which the collector rings $b^6$ are mounted. The rear end of this extension is supported in bearings in a member H which in turn is securely supported by a transverse member $h$ of the frame $A'$. The armature $B^2$ has a shaft G which projects through the end portion $B^3$ of the field frame $B'$ and is supported in bearings therein. This shaft G also projects freely through the extension of the frame $B'$ and the rear end of the shaft G projecting beyond the end of the extension is squared or otherwise formed to hold a clutch member D against rotation on itself, but to permit longitudinal movement thereof. The rear end of the shaft G projects into proximity with the center of clutch member $c$ on the shaft of motor armature $C^2$ but is not connected thereto, this clutch member $c$ being fixed to the motor shaft, as is apparent from Fig. 3.

The clutch D has a jaw face $d$ opposed to and adapted to engage the clutch $c$, and also has oppositely facing a jaw face $d'$ opposed to and adapted to engage a fixed clutch portion of H. Between the two jaw faces on the two ends of clutch D, is a ring $d^3$, which is engaged by a fork lever $j'$ pivoted, and turning with a rockershaft $j^2$, which is operable by the substantially horizontal arm $j^3$, connected with a pusher rod J having the handle $j$. This pusher rod is held by spring detent in any of two positions, namely, with clutch D engaging the fixed clutch member H or in the opposite position with the clutch engaging $c$, the clutch member of the motor armature $C^2$.

Figure 1:
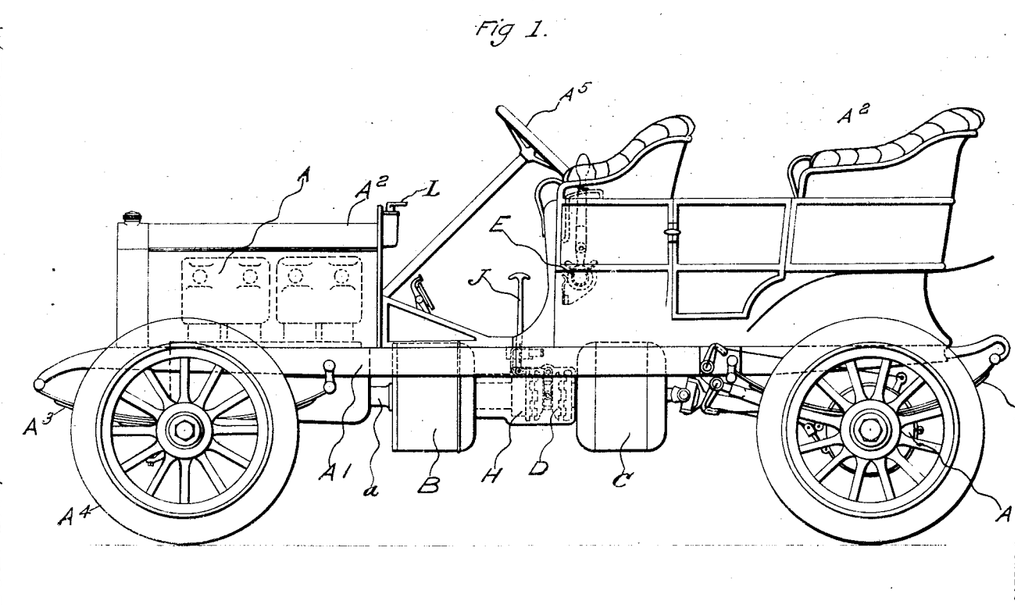
Figure 1 is a side elevation of an automobile showing the general arrangement of power transmission and control parts and other elements.
Figure 2:
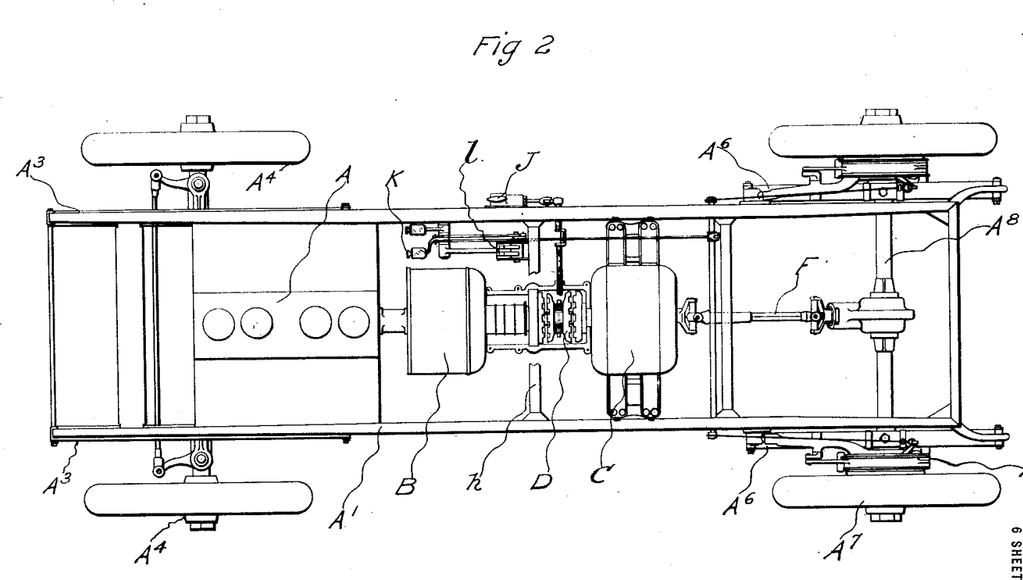
Fig. 2 is a plan view of an automobile, body removed, showing the top view of the various elements.
Figures 5, 6:
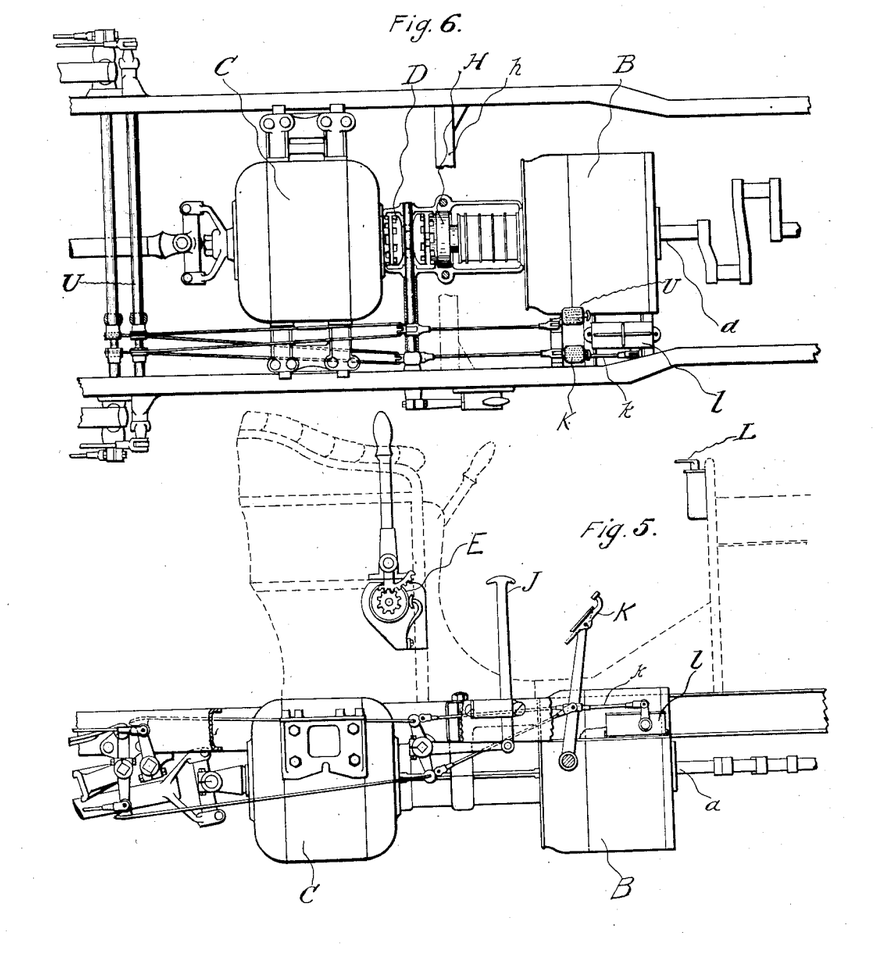
Fig. 5 is a side elevation, showing the electrical units, controller and other controlling means and connections, shown as viewed from the far side of the vehicle in Fig. 1.
Fig. 6 is a plan of the electrical elements and interconnections as shown in Fig. 5.

The pedal lever K is connected by a rearwardly extending rod to operate external brake bands on each of the rear wheels, while another link $k$ connects with a cut out switch 1, shown in Fig. 2, to the rear of the pedal pivot and in Fig. 5 in a modified form forward of the pedal. A second pedal operates other brakes which are not however connected with the electrical transmission or control.

Figure 8:
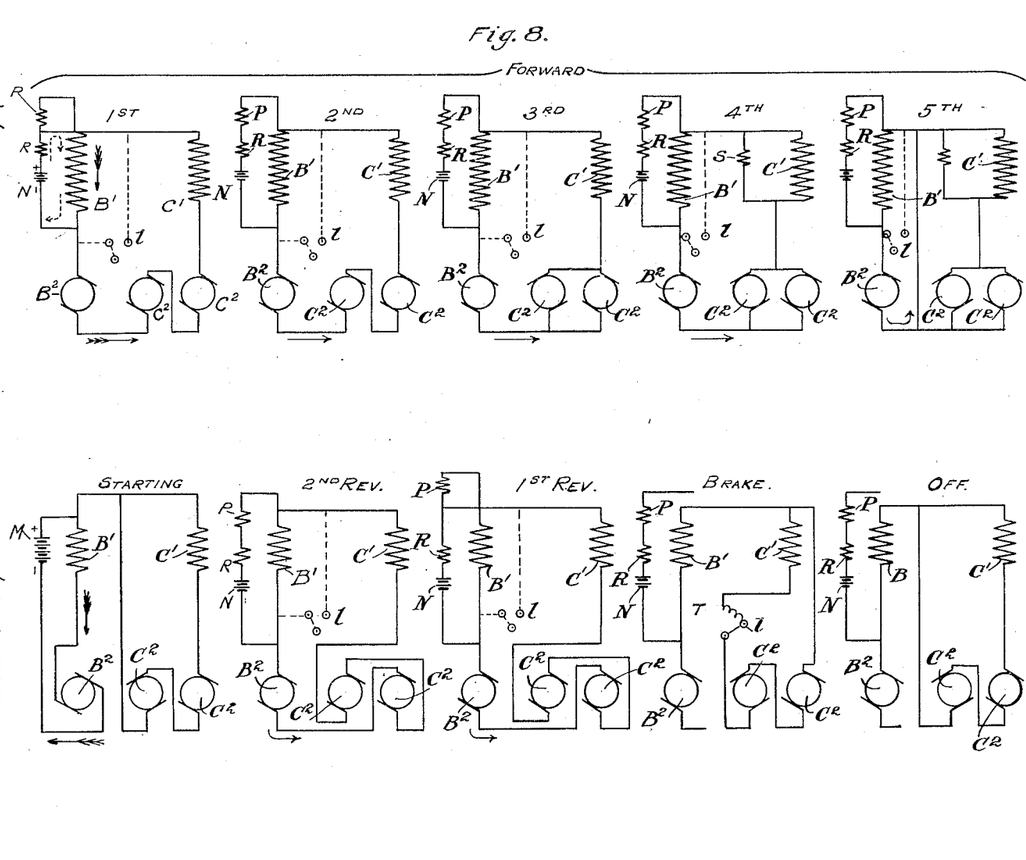
Fig. 8 diagramatically shows the different electrical connections upon different positions of the controller for starting, speeds forward and reverse.

In the wiring diagram, in Fig. 8, M is a storage battery, which I call the starting battery, which may be connected in series with the field and armature of the motor generator B, which will then act as a motor to start the engine. This battery is employed only for starting purposes, and when the vehicle is moving either forwardly or rearwardly, the battery is disconnected or has its circuit open. Another smaller exciter battery N is so connected that in the first position for ahead or reverse, it will be in a shunt circuit of the field of the generator B, in which circuit there will then also be a predetermined resistance R, which I call the starting resistance.

An additional resistance P which I call the running resistance is arranged so that it may be inserted in the shunt circuit about the field of generator B.

In accordance with the present invention, as will appear later, for all positions of the main controller for forward or reverse movement of the vehicle, the exciter battery N is connected in shunt about the field of generator B.

An additional resistance S is so connected that it may constitute a part of a shunt to the circuit of the motor field $C'$ of the second electrical unit C. The armature of this motor has two independent windings $C^2$ $C^2$ through which current can be passed either in series or multiple. In circuit with the motor C, I may also introduce a variable resistance indicated as the rheostat T.

More particularly with reference to Fig. 8, it will be seen that there are indicated diagrammatically the five arrangements of the electrical connections as they exist in five positions of the controller E, for transmitting power to normally propel the vehicle forward. The diagrams for these positions are bracketed under the word "forward". In the first position it will be seen that field $B'$, armature $B^2$, both motor armature windings, $C^2$ $C^2$, motor field $C'$, are all in series, while in a shunt in the field $B'$ is the exciter battery N as well as the starting resistance R. In the second position it will be seen from the diagram that the connections are the same as in the first position, except that the last mentioned shunt also includes the addition of the running resistance P. In the third position it will be seen that the conditions are as in the second position, except that the two coils of the armature $C^2$ are in parallel instead of in series. In the fourth position the connections are the same as the third, except that a shunt with a resistance S is introduced around the field C'. In the fifth position the field and armature of the first unit B and the motor C are each short circuited upon themselves.

In the second row of diagrammatic figures the first, marked "starting", includes the starting battery M in circuit with the field and armature of the first unit B. The figure on the extreme right marked "off" shows the field and armature of the electric unit B open, while the field and armature coils on the motor unit C are in closed circuit. The diagram to the left of this marked "brake", shows the field and armature of the electric unit B in open circuit, while in the closed circuit of the field C', and the two armature windings $C^2$, $C^2$ of the motor C, there is included variable rheostat T. The first diagram to the left (marked first reverse) indicates the first position for reverse propelling of the vehicle and in this the electric unit B has its field and armature in circuit and in series with the field and armature coils of the second or motor unit, but the field and armature of the motor C are connected in reverse direction to each other. The diagram to the left of this (marked second reverse) shows the connections for the second reverse position which are the same as in the first reverse position, except that the shunt for the field B' includes the additional resistance P.

Figure 7:
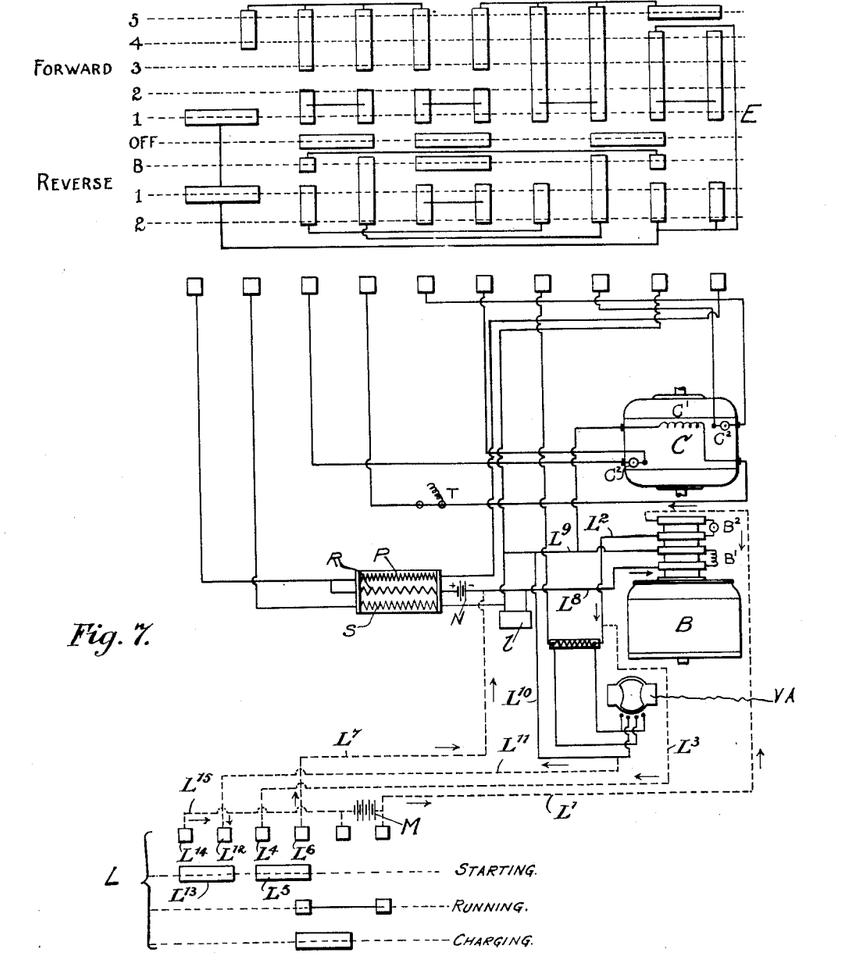
Fig. 7 is a wiring diagram including diagrammatically the development of the controller contacts.

In Fig. 7 there is shown diagrammatically the controller E with the contacts on its surface developed, while dotted transverse lines through the contacts show the connections the fingers will make at the respective positions indicated at the second and first reverse positions, the brake position, the off position and the first, second, third, fourth and fifth forward running positions. Directly below the development of the controller E are shown the terminals from the armatures and fields of the two electrical units C and B and the wiring connections with the starting battery M, the running resistance R, the additional resistance P, the rheostat T and the resistance S for the shunt in the motor field. In dotted lines in the lower portion of this diagram are indicated the connections to the starting controller L, showing how the starting battery M is introduced. The controller contacts as developed are diagrammatically shown in their respective positions for starting, running and charging as indicated in the drawing. In the diagram, 1 indicates the cut-out switch by which the fields of the unit B are short circuited. Suitable connections are made for the meter V—A as indicated.

With reference to the above description and the accompanying drawings, showing a particular embodiment of my invention, the operation will be understood as follows: In order to start the vehicle, the small controller L is placed in the starting position as indicated in Fig. 7 and the starting battery M is then in series with the field coils B' and armature $B^2$ of the generator and the armature is held stationary either by the clutch D engaging the fixed clutch member H, or engaging the armature C of the motor which is held stationary when the vehicle is stationary. The battery M, passing current through the field and armature of the generator B, but with a relative direction of current through the field coil and armature coil in the opposite direction to that of normal operation, causing a rotation of the field magnet frame and engine A in the direction of normal engine rotation. This reversal of armature coil connections is effected by a suitable contact on the small controller L. The starting of the motor A in this way, by the starting battery M is effected when the main controller is on the off position, in order that when the small controller is shifted to the running position, the connections will not be such as to drive the vehicle. The path of the current from the starting battery M when the controller L is in starting position may be traced as follows, the direction of the current being indicated by the arrows in Fig. 7: From the positive side of battery M, conductor L' to one of the collector rings $b^6$, through the armature $B^2$ to a second collector ring, conductor $L^2$, conductor $L^3$, contact finger $L^4$ of controller L, segment $L^5$ of controller L, finger $L^6$ of controller L, conductor $L^7$, conductor $L^8$ to one of the collector rings, field winding B' to the fourth collector ring, conductor $L^9$, conductor $L^{10}$, conductor $L^{11}$, contact finger $L^{12}$ of controller L, segment $L^{13}$ of controller L, finger $L^{14}$ of controller L, and conductor $L^{15}$ to the negative side of the battery. After the engine has been started the small controller L is switched to the running position, establishing the relation between field and armature coil which permits the generator to generate with the rotation of the field magnets around its armature in the direction of the engine rotation. For all operative positions of the main controller, either forward, reversing or electrical braking, the small controller L is left in the running position.

Assuming now that the main controller is in the off position, there will be no current generated by B, because the generator circuit is opened as shown in Fig. 8, and the prime mover, namely, the internal combustion engine A will be running with the field frame of the generator B, substantially as a fly wheel. In order to now start the vehicle forward, the main controller is moved to the first forward position which results in putting the exciter battery N with the resistance R in shunt circuit with the field coil B' of the generator. In this position the current of small battery N causes an excitation of the field B' and the circuit being closed through the armature current is generated in the armature and the direction of current thus generated is such that the armature B² has a tendency to revolve in the same direction as the field magnet frame and the direction of current from the generator through the motor armatures C² C² and field C', is such as to produce in the motor a turning effort in the same direction as that of the generator armature B² all tending to propel the vehicle forward. It should be noted that in this first position the two motor armature windings C² C² are in series and the full current of the circuit passes through the field coils C' of the motor C, whereby the greatest turning effort for a given current is secured from the motor C, while at the same time, the shunt consisting of the exciter battery N and the resistance R regulates the current to the generator field coil B' as follows: Until sufficient current passes through the field coil B' to establish a difference of potential equal to the voltage of exciter battery N current flows from the exciter battery N through the field coil B' in the normal direction, providing a means for exciting the generator B. When generator current in excess of this amount flows through the field coils B' so the difference of potential at its terminals exceeds that of the exciter battery N current is diverted from the field coil B' and flows through exciter battery N and the resistance R in a direction to charge the exciter battery N. The shunt circuit consisting of exciter battery N and resistance R thus provides a means for exciting the field coil B' and above a predetermined current for shunting generator current from the field coil B' thereby weakening the field strength of the generator B at times of heavy loads thus permitting of a greater slip or speed difference between the field frame and the armature of the generator B and allowing a larger current to be maintained in the armature B² and the motor C, than is the case with other controller positions, where the field coil B' receives the full current generated in the armature B². It is thus seen that the shunt circuit consisting of a source of electro-motive force and a resistance provides a means of establishing a substantially constant amount of current in the field coils B', independent of the amount of current generated in the armature B². During the condition of zero or low current in the armature B², this shunt circuit provides an independent source of excitation to the field coil B' during which exciter battery N is discharging and a higher current in the armature B², it serves as a means for limiting the flow of current to the field coil B' the diverted current passing through and charging the exciter battery N.

The direction of generator current is indicated by the solid line arrows, and the direction of current from the exciter battery N when said battery is discharging is indicated by the dotted arrows in the diagram of Fig. 8 illustrating the connections for the first forward position of the controller. The direction of current from the generator, when it is functioning as a generator, is always the same, as is indicated by the arrows in all of the upper row of diagrams of Fig. 8. Of course, when the battery N is being charged, the direction of current through the battery is the reverse of that indicated by the dotted arrows. When the controller is in its first forward position, and in fact in all of its forward positions, the clutch D is in position such as to connect together the motor and generator shafts. When the controller is in its reverse positions, the clutch D is in the opposite position so as to disconnect the motor and generator shafts and to hold the generator shaft stationary.

The second forward position of the main controller E establishes the same relative connections between the generator armature B² and the generator field B and the field C' and armature winding C² C² of the motor C as in the first position, but the resistance in the shunt circuit of generator field B' is increased by the addition of the resistance P. This increased resistance of the shunt circuit is of an amount sufficient to permit practically all of the current generated in the generator armature B² to pass through the field coils, but the shunt circuit of the field B' functions in the same manner as in the first controller position, except to a very much less degree. The exciter battery N still discharges at light loads through the field coils B' thus preventing an unsteady generation of current in the generator B which might ensue with light loads and the exciter battery N is still charged by small amount at times of heavier current in the generator circuit, thus preventing its being exhausted. The current value at which discharging of the exciter battery N stops, and charging of the exciter battery N commences, is less than the average current required to propel the vehicle, thus the exciter battery N averages a greater amount of charge than discharge.

On the third, fourth and fifth forward controller positions and the second reverse positions, the relation and resistance of the shunt circuit to the generator field coil B' is the same as in the second forward position. The first reverse position is the same as the first forward position as far as the relation of amount of resistance in the shunt circuit to the field coils B'.

In the third forward position, the two windings of the motor armature $C^2$ $C^2$ are in parallel dividing the current of the generator B between them. The field coils of the motor C' receiving the full current of the generator the result being that a less turning effort is developed in the motor C, than in the case where the armature windings, $C^2$ and $C^2$ are in series and a less counter electro-motive force is developed in the motor C, thereby calling for less speed difference between the engine driven field and the armature of the generator B, thus driving the driving shaft at a higher speed with less turning effort.

On the fourth forward controller position the relation of the armatures, of the generator and motor are the same as in the third position, but the turning effort of the motor C is still further reduced and the counter electro-motive force of the motor C still further reduced by the weakening of the motor field C' by diverting current from it by means of the shunt resistance S thus giving still less turning effort to the driving shaft and a higher speed.

On the fifth forward controller position, a short circuit is established by which the whole current of the generator B flows in its own circuit including the armature $B^2$ and the field coil B'. This short circuiting connection also short circuits the motor C the relation of whose field and armature winding are the same as in the previous controller position, but no current is generated in the motor circuit as a result of this short circuit, as with the vehicle driven in the forward position any tendency of current flow kills generation instead of building it up. The motor C thus remains neutral without any drag upon the driving shaft. It adds no turning effort to the driving shaft and it has no counter-electro-motive force so that the speed difference between the engine driven field and the armature of the generator B need only be sufficient to generate a voltage equal to forcing current through its own internal resistance. This results in the highest speed of the driving shaft and the least driving effort of the driving shaft for a given engine driving effort and is a position which the revolving field frame and armature of the generator B acts substantially as an electric clutch to transmit the driving effort of the engine to the driving shaft without generating any external electric energy and without any aid from the motor C.

The first and second reverse controller positions have the same electrical relation of armature winding $B^2$ and field coil B' and field shunt circuit, as in a corresponding forward controller position, but the relative direction of current through the armature windings $C^2$ $C^2$ and field winding C' of the motor C is reversed, so that current passing through them gives the motor C a turning effort opposite to that which they had in the forward controller positions and opposite to the turning effort of the generator armature $B^2$, which is necessarily always the same as that of the engine driven field of the generator B.

On neutral or off controller position the circuit of the generator B is open and the circuit consisting of the battery N and the resistance R and P is open, so that it is impossible for the generator B to generate or the battery N to discharge. The circuit of the motor C, however, is closed upon itself, the relation of its armature windings and field coil being the same as in the first and second forward controller positions.

In the braking position of the controller, the generator B and the shunt circuit, comprising the battery N and the resistances R and P are open, the same as in the off position of the controller. The motor C has its circuit comprising its armature winding and field coil closed upon itself, but with the connections made between them, the same as in the reverse controller positions.

The object of maintaining the motor circuit closed upon itself on the off and braking position although the generator circuit is open and cannot furnish current to the motor, is to cause the motor to generate within itself and cause a braking action upon the driving shaft. The relation of the armature windings $C^2$ $C^2$ and field coil C' to each other on the off position, is the same relation as upon all forward speed positions of the controller and with these connections the motor will not generate when the vehicle is running in a forward position, even though it is short circuited upon itself, for the reason, that any generation of current which would start in the armature, due to the residual magnetism of the field magnets would flow through the field coil in such a direction as to kill the permanent magnetism, but if the vehicle should start to run backward, then the motor would immediately generate current within its closed circuit, as a direction of current which started in the armature winding would be in the opposite direction than when running forward and would build up and strengthen its field magnets, establishing a heavy current within its own circuit at a very low speed, thus forming a very powerful automatic braking effect for reverse direction of movement of the vehicle. It should be noted that on every forward controller position, that the motor C has its circuit closed, except that in the first four forward speed positions, the generator armature and field is included in the circuit, so that the same braking action would result on any of the forward controller positions, if the engine would stop and the vehicle start to run backward.

On the braking position of the controller, as above described, the same braking action of the motor takes place as described for off position, but as the relation of the armature winding and field coil of the motor to each other is the reverse of that in the off position, the braking effect takes place when the vehicle is moving in the opposite direction or when running forward. The amount of this electrical braking action can be controlled by varying the resistance T in the circuit of the motor C, the greater the resistance included in the circuit the less the braking action. This controllable resistance is actuated by means of the rheostat T.

The electric connections and circuits described in all of the controller positions produce the results stated in the generator B and the motor C respectively, but as the clutching action of the generator B is always in the same direction as that of the engine rotation and is opposed by the motor C in the reverse position of the controller, the mechanical clutch D has been provided to couple the armature shaft of the generator B and the motor C together when they are exerting a turning effort in the same direction and to disconnect them and hold the armature shaft of the generator B stationary when the turning effort is in an opposite direction. In other words, on the forward position of the controller the greatest efficiency is obtained by coupling the two armature shafts together, while in the reverse position of the controller, the most efficient results are obtained by unclutching the shaft of the generator and motor and holding the generator armature stationary, leaving the motor armature alone connected to the driving wheels. With the armature shaft of the generator B and the motor C locked together and both connected to the driving shaft, the generator B becomes an electric clutch transmitting the full turning effort of the engine to the driving shaft, and electrical energy which it furnishes to the motor, gives the latter, a turning effort in the same direction, which is added to the turning effort of the gererator B. Under these conditions the efficiency of the apparatus is far greater than where the generator B is used simply as a generator, as would be the case when its armature is held stationary, but on the reverse positions of the controller it is more efficient to disconnect the armature shaft of the motor and the generator, as on those positions their turning efforts oppose each other. As efficiency for reversing, however, is of comparatively small importance, I find it advantageous to use this method of reversing rather than installing a mechanical reversing gear. I am enabled by this method to drive the vehicle both forward and backward without changing the direction of rotation of the engine and without making any mechanical change between the driving shaft and the driving wheels and have disposed of the use of gears for this purpose. On any controller position further regulation of the speed and driving effort of the vehicle can be secured by the control of the engine speed in driving it, the functioning of the apparatus on any of the controller positions being independent of the speed of the engine.

It will thus be seen that having started the engine A the entire control of speed and power of the engine, may be regulated entirely by my controller E, both as to forward movement and reverse, and braking. While, as just mentioned, the regulation of the vehicle is reduced to the simplest possible form, namely, a single lever operating the controller, I may by the addition of one lever, J, improve the control still further for the conditions of reverse driving. In addition to the electrical braking, I may use the mechanical brake actuated by the pedals K and U, one of which is connected to operate short circuiting switch 1 by means of which the field coil B' is short circuited, thus preventing generation of current in the generator B and preventing the driving effort of the engine being communicated to the driving wheels. It is thus not necessary when applying mechanical brake by means of the pedal K to remove the controller E to the off position. In this manner it will be seen that the entire operation of the vehicle is under control of the operator in the simplest possible manner and at the same time every means of control is provided for most effective operation in emergency.

The disconnecting of the shaft of armature $B^2$ of the generator from the armature shaft of $C^2$ is effected by means of the clutch D, being operated by the connections $j'$, a shaft $j^2$, lever $j^3$ and pusher rod J. Upon pulling the pusher rod J upward, the clutch D is thrown forward, so that it engages the fixed clutch member H secured in brackets to a member of the frame and being engaged on the squared portion of armature shaft G it securely holds armature shaft $B^2$ stationary. The spring detent securely holds pusher rod J in this upward position and insures the positive engagement of the clutch. Upon forcibly pressing the pusher rod J downward to the full extent, the spring pressed detent engages another notch on J after the clutch D has moved rearwardly so that its jaws *d* engage the jaws on the clutch member *c* and connect with the shaft of armature C², and owing to the engagement of the clutch D with the squared portion of shaft G of armature B², the two armature shafts are securely locked or clutched together in this position.

From the four collector rings $b^6$, two of the leads go to the brushes $b^1$, engaging the commutator $b$, while the leads from the other two collector rings $b^6$ $b^6$ go to the coils of the field B'. A housing or shield B⁴ protects the rear end of the field frame of B and thereby the brushes $b'$ and brush holders and connections likewise protecting the commutator of the armature B².

Figure 4:
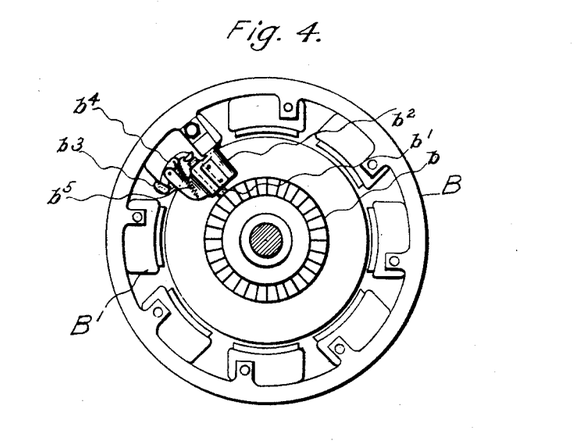
Fig. 4 is an end view taken at the section 1—1 of Fig. 3.

In order to secure a uniformly good contact between the brushes $b'$ and the commutator $b$ the brush holders are preferably constructed in a special manner illustrated in detail in Fig. 4. In that figure, which is an end view of generator B, with the field frame end removed, there is shown the armature with its commutator, and around it the frame with fields B'. Only one brush holder is shown for purposes of illustration, and comprises the holder frame $b^2$ bolted to the field frame, and arranged to guide the brush $b'$. A projection from this holder frame supports the lever $b^4$, one arm of which engages the outer end of the brush $b'$, and the same end of the lever $b^4$ is drawn inwardly by a spring $b^5$, so that the lever $b^4$ compresses on the brush $b'$ forming it into the desired contact with the commutator $b$. At the opposite end of the lever $b^4$ is a weight or an enlargement $b^3$ of a predetermined mass. Constructed as just described and shown, the brushes will be pressed into engagement with the commutator with the desired pressure, and upon rotation of the field frame of the generator B, the centrifugal force of one arm of the lever $b^4$, as well as the brush proper or spring will be counteracted by the centrifugal force of the mass $b^3$ at the opposite end. This balance of the effect of any centrifugal force on the parts of the brush frame which might be affected by the rotation of the field, insures the brush being constantly forced into a predetermined and the desired contact with the commutator.

While I have shown one particular form of my balanced brush construction, I do not wish to limit myself to this particular form, but various modifications in detail and arrangement are possible within the scope of my invention.

In the drawings, forming a part hereof, and the description, the details of mechanical construction and the electrical details, as diagrammatically illustrated or described, it will be understood may be varied without departing from my invention, and various modifications and changes may be made, but

What I claim and desire to secure by Letters Patent is:

1. In combination in a vehicle having a mechanical brake, a propelling system including electro mechanical means for converting and transmitting energy to the driven wheels comprising a plurality of electrical units, an operating lever to simultaneously short circuit the field of one of said units and apply the mechanical brake.

2. In a self-propelled vehicle having a mechanical brake, electrical transmission mechanism for converting and transmitting power to the driven wheels or axle, including a generator, an operating lever to short circuit the field of said generator and apply the mechanical brake.

3. In combination in a self-propelled vehicle, a propelling system for the vehicle, comprising an engine, a generator adapted to be driven thereby, a motor adapted to receive current from the generator, a controller for establishing different electrical connections between the generator and motor, and for starting or interrupting the transmission of current between the generator and motor, said generator having an armature winding and a field winding connected in series therewith, and means for stopping the generation of current without opening the circuit between the generator and motor, said controller and said means being each operated independently of the other.

4. In combination in a self-propelled vehicle, a propelling system for the vehicle, comprising an engine, a generator adapted to be driven thereby, a motor adapted to receive current from the generator, a controller for establishing different electrical connections between the generator and motor and for starting or interrupting the transmission of current between the generator and motor, said generator having an armature winding and a field winding connected in series therewith, and means independent of said controller for stopping the transmission of current between the generator and motor, and consisting of a switch adapted to short-circuit the field of the generator.

5. In combination in a self-propelled vehicle, a propelling system for the vehicle, comprising an engine, a generator adapted to be driven thereby, a motor adapted to receive current from the generator, a controller for establishing different electrical connections between the generator and motor and for starting or interrupting the transmission of current between the generator and motor, said generator having an armature winding and a field winding connected in series therewith, and means independent of said controller for stopping the transmission of current between the generator and motor, and comprising a switch and an operating lever therefor for short-circuiting the field of the generator.

6. In combination in means for electrical transmission and control, a prime mover, a generator having field magnet frame and field magnet coils, and an armature, an electric motor having field magnet coils and an armature with a plurality of armature windings each connected to its own commutator, means for connecting the armature of the generator with the armature of the motor and means for disconnecting them and holding the generator armature stationary, a controller, means for connecting all of the armature windings of the motor and its field coils and the armature winding of the generator and its fields coils all in series, means for connecting the armature windings of the motor in multiple relation to each other and connecting such group in series with the field coil of the motor and the field coils and armature winding of the generator and means for providing a short circuiting connection which shall both short circuit the generator armature and field coils upon themselves in series relation and simultaneously short circuit the motor armature windings and its field coils upon themselves in series relation.

7. In combination, in an electric transmission and control system, a prime mover, a generator having a field frame and a field winding and an armature, an electric motor having a field and an armature provided with a plurality of armature windings, a controller including means for connecting the motor armature windings, motor field and the generator armature and field all in series, means for connecting the motor armature windings in multiple and in series with the motor field, and the generator armature and field, and means for short circuiting the generator armature and field upon themselves in series relation, and the motor armature windings and field upon themselves in series relation.

8. In combination, in an electric transmission and control system, a prime mover, a generator having an armature and a field one of said generator elements being mechanically connected to the prime mover, a motor having a field and two armature windings, and controlling mechanism including means for connecting the generator armature and field, motor armature windings and field in different relations, an exciter battery, and means for connecting said exciter battery in shunt to the generator field.

9. In an electric transmission and control system, a prime mover, a generator having an armature and a field one of said elements of the generator being connected to the prime mover, a motor including two armature windings and a field, an exciter battery for the generator, and a controller having means for connecting the field and armature of the generator and the field and armature windings of the motor all in series relation and at the same time connecting said battery in a shunt circuit about the generator field, means for varying the resistance of the shunt circuit, and means for changing the armature windings of the motor from series to parallel relation.

10. In an electric transmission and control system, a prime mover, a generator having an armature and a field one of said elements of the generator being connected to the prime mover, a motor including two armature windings and a field, an exciter battery for the generator, and a controller having means for connecting the field and armature of the generator and the field and armature windings of the motor all in series relation and at the same time connecting said battery in shunt circuit about the generator field, means for varying the resistance of the shunt circuit, means for changing the armature windings of the motor from series to parallel relation, and means for establishing a shunt circuit about the motor field winding.

11. In an electric transmission and control system, a prime mover, a generator having an armature and a field one of said elements of the generator being connected to the prime mover, a motor including two armature windings and a field, an exciter battery for the generator, and a controller having means for connecting the field and armature of the generator and the field and armature windings of the motor all in series relation and at the same time connecting said battery in a shunt circuit about the generator field, means for varying the resistance of the shunt circuit, means for changing the armature windings of the motor from series to parallel relation, means for establishing a shunt circuit about the motor field winding, and means for short circuiting the generator field and armature upon themselves.

12. In an electric transmission and control system for vehicles, a prime mover, a generator having a field and armature one of said elements of the generator being connected directly to the prime mover, a motor having a field and two armature windings, an exciter battery for the generator, and a controller including means for connecting the generator armature and field and motor armature windings and field all in series relation and for connecting the exciter battery in shunt to the generator field, for varying the resistance of the shunt circuit, for changing the motor armature windings from series relation to parallel relation, for establishing a shunt circuit about the motor field, and for establishing a connection which simultaneously short circuits the generator field and armature upon themselves, and the motor armature windings and field upon themselves.

13. In a self-propelled vehicle, an engine, a generator adapted to be driven thereby, a propelling motor adapted to receive current from the generator, a controller having a plurality of operating positions and adapted to establish various electrical connections between the generator and motor, and when in one position serving to establish a connection which short-circuits the generator upon itself and short-circuits the motor upon itself.

14. In a self-propelled vehicle, an engine, a generator having field and armature elements, one of which is connected to the engine, a propelling motor adapted to receive current from the generator, a controller for varying the connections between the motor and generator, a manually operable member for shifting said controller, and foot operated means for varying the connections independently of said manually operable member and serving to stop the generation of current without opening the circuit of the generator, and said controller and foot-operated means each being operated independently of and without affecting the other.

15. In a vehicle propulsion system for a vehicle having a rear axle, a source of mechanical energy, electrical means for converting and transmitting the same to the rear axle including a generator, a motor, a controller for establishing different electrical connections between the generator and the motor, and a foot operated means for throwing the generator into and out of service without opening the generator circuit, said controller and foot-operated means each being operated independently of and without affecting the position of the other.

16. In a propulsion system for a vehicle having a rear axle, an engine, an electrical transmission between the engine and rear axle, comprising a generator having field and armature elements, a motor adapted to receive current from the generator, a hand operated controller for establishing different electrical connections between the motor and generator, and foot operated means for causing the transmission to be thrown into and out of service without opening the generator circuit, said controller and said foot-operated means each being operated independently of the other and without affecting the position of the other.

17. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect said machines in series to actuate the load; to vary the field excitation of one or both of said machines; and to short-circuit the first machine on itself to act as a magnetic clutch.

18. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to connect the said machines in series to actuate the load; to vary the field excitation of the first machine; to vary the field excitation of the second machine; and to short-circuit the first machine on itself to act as a magnetic clutch.

19. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short-circuit the second machine to act as an electric brake, the first machine being ineffective; to connect said machines in series to actuate the load; and to short-circuit the first machine on itself to act as a magnetic clutch.

20. In a device for transmitting power from a prime mover to a load; the combination of a dynamo electric machine, one element of which is connected to the prime mover and the other to the load; a second dynamo electric machine, one element of which is stationary and the other connected to the load; and a controller having its contacts and connections arranged to short-circuit the second machine with field reversed through a resistance to act as an electric brake; to connect said machines with fields unreversed to actuate the load; and to short-circuit the first machine on itself to act as a magnetic clutch.

21. In a device for transmitting power from a prime mover to a load; the combination of a dynamo electric machine, one element of which is connected to the prime mover and the other to the load; a second dynamo electric machine, one element of which is stationary and the other connected to the load; and controlling means having its contacts and connections arranged to connect the first machine with field reversed to a storage battery to start the prime mover, the second machine being ineffective; to connect said machines in series with fields unreversed to actuate the load; and to short-circuit the first machine on itself to act as a magnetic clutch.

22. In a device for transmitting power from a prime mover to a load; the combination of a dynamo electric machine, one element of which is connected to the prime mover and the other to the load; a second dynamo electric machine, one element of which is stationary and the other connected to the load; and controlling means having its contacts and connections arranged to connect the first machine with field reversed to a storage battery to start the prime mover, the second machine being ineffective; to short-circuit the second machine to act as an electric brake, the first machine being ineffective; to connect said machines in series with fields unreversed to actuate the load.

23. In a device for transmitting power from a prime mover to a load; the combination of a dynamo electric machine, one element of which is connected to the prime mover and the other to the load; a second dynamo electric machine, one element of which is stationary and the other connected to the load, and controlling means having its contacts and connections arranged to connect the first machine with field reversed to a storage battery to start the prime mover, the second machine being ineffective; to short-circuit the second machine to act as an electric brake, the first machine being ineffective; to connect said machines in series with fields unreversed to actuate the load; and to short-circuit the first machine on itself to act as a magnetic clutch.

24. In a device for transmitting power from a prime mover to a load; the combination of a dynamo electric machine, one element of which is connected to the prime mover and the other to the load; a second dynamo electric machine, one element of which is stationary and the other connected to the load; and controlling means having its contacts and connections arranged to short-circuit the second machine to act as an electric brake, the first machine being ineffective; to connect the first machine with field reversed to a storage battery to start the prime mover, the second machine being ineffective; to connect said machines in series with fields unreversed to actuate the load; and to vary the field excitation of one or both of said machines.

25. In a device for transmitting power from a prime mover to a load; the combination of a dynamo electric machine, one element of which is connected to the prime mover and the other to the load; a second dynamo electric machine, one element of which is stationary and the other connected to the load; and controlling means having its contacts and connections arranged to short-circuit the second machine to act as an electric brake, the first machine being ineffective; to connect the first machine with field reversed to a storage battery to start the prime mover, the second machine being ineffective; to connect said machines in series with fields unreversed to actuate the load; to vary the field excitation of one or both of said machines; and to short-circuit the first machine on itself to act as a magnetic clutch.

26. In a device for transmitting power from a prime mover to a load; the combination of a dynamo electric machine, one element of which is connected to the prime mover and the other to the load; a second dynamo electric machine, one element of which is stationary and the other connected to the load; and controlling means having its contacts and connections arranged to short-circuit the second machine with field unreversed to act as an electric brake during movement in one direction; to short-circuit said second machine with field reversed to act as an electric brake during movement in the opposite direction; to connect said machines with fields unreversed in series to actuate the load; and to vary the field excitation of one or both machines to vary the relation of speed and torque.

27. In a device for transmitting power from a prime mover to a load; the combination of a dynamo electric machine, one element of which is connected to the prime mover and the other to the load; a second dynamo electric machine, one element of which is stationary and the other connected to the load; and controlling means having its contacts and connections arranged to short-circuit the second machine with field unreversed to act as an electric brake during movement in one direction; to short-circuit said second machine with field reversed to act as an electric brake during movement in the opposite direction; to connect said machines with fields unreversed in series to actuate the load; to vary the field excitation of one or both machines to vary the relation of speed and torque; and to short-circuit the first machine on itself to act as a magnetic clutch.

This specification signed and witnessed this 20th day of February, 1908, in the presence of two witnesses.

JUSTUS B. ENTZ.

Witnesses:
HERMANN F. CUNTZ,
E. REINACHER.